United States Patent

[11] 3,633,125

[72] Inventor David R. Whitehouse
         Weston, Mass.
[21] Appl. No. 48,494
[22] Filed June 22, 1970
[45] Patented Jan. 4, 1972
[73] Assignee Raytheon Company
         Lexington, Mass.
         Continuation-in-part of application Ser. No.
         625,732, Mar. 24, 1967, now abandoned.
         This application June 22, 1970, Ser. No.
         48,494

[54] GAS LASER WITH MEANS FOR SPECIFICALLY CREATING AND MAINTAINING TURBULENCE IN THE GASEOUS LASER MEDIUM
     24 Claims, 6 Drawing Figs.
[52] U.S. Cl. .................................................. 331/94.5
[51] Int. Cl. .................................................. H01s 3/09, H01s 3/22
[50] Field of Search ........................................ 331/94.5

[56] References Cited
UNITED STATES PATENTS
3,302,167  1/1967  Shao-Chi-Lin ............... 331/94.5
3,394,320  7/1968  Medicus ...................... 331/94.5

OTHER REFERENCES

Polanyi, " Proposal for an Infrared Maser Dependent on Vibrational Excitation," J. of Chem. Phys. 3, (4), Jan., 1961, pp. 347–348.

Polanyi, " Chemical Processes," Chapter 21 in Atomic & Molecular Processes, ed. by Bates, Academic Press, (New York) June 19, 1962, pp. 807, 830–837.

Legay–Sommaire et al., " Realization of a Laser Utilizing the Vibrational Energy of Gases Excited Theactine Medium," in French Compt. Rend. Acad. Sc. Paris, 260, 22 March 1965, pp. 3,339–3,342.

Hurle et al. " Electronic Population Inversions by Fluid Mechanical Techniques," The Physics of Fluids, Vol. 8, No. 9, Sept. 1965, pp. 1,601–1,607.

*Primary Examiner*—Ronald L. Wibert
*Assistant Examiner*—R. J. Webster
*Attorney*—Harold A. Murphy ABSTRACT: A gaseous laser having improved output characteristics comprising an elongated chamber containing a supply of a selected molecular gaseous medium, means for electrical discharge pumping or excitation of the gaseous medium for generation of output electromagnetic radiation, and means for creating turbulence within the gaseous medium for increasing uniformity of the temperature and the electrochemistry of the gaseous medium throughout the effective volume thereof.

INVENTOR
DAVID R. WHITEHOUSE

GAS LASER WITH MEANS FOR SPECIFICALLY CREATING AND MAINTAINING TURBULENCE IN THE GASEOUS LASER MEDIUM

This is a continuation in part of Ser. No. 625,732 filed Mar. 24, 1967 now abandoned.

The invention herein described was made in the course of or under a contract, or subcontract thereunder, with the United States Army Missile Command.

BACKGROUND OF THE INVENTION

This invention relates to improvements in lasers and has particular reference to molecular gaseous lasers wherein a gas or combination of gases flows through an optical cavity and is simultaneously subjected to electrical discharge pumping to produce emission of electromagnetic radiation of a substantially coherent nature. More particularly the invention is concerned with a gas laser having increased gain and power output resulting from the creation of turbulence within the gaseous medium.

In the manufacture and operation of gaseous lasers, there is provided an elongated envelope or tube forming at least a portion of an optical cavity into one end of which the selected gaseous medium is injected. This gas is drawn through the cavity by means of a pump and is ejected from the opposite end thereof. Simultaneously therewith, the gas in the tube is subjected to electrical discharge pumping which creates population inversion of the energy levels in a manner which is well known and conventional in gas lasers. Such inversion results in the creation of radiation which passes back and forth between reflectors located at opposite ends of the tube and eventually exits through one of the reflectors as a beam of coherent electromagnetic radiation.

One particularly desirable gaseous medium comprises a mixture of carbon dioxide ($CO_2$), helium and nitrogen. This is known as a molecular gaseous medium and, during the electrical discharge pumping, it has been found that electrons in the discharge produce dissociation of the carbon dioxide so that a nonuniform electrochemistry of the gases throughout the cross section of the cavity results. Initially, the gases of the medium are thoroughly mixed prior to injection into the device. However, the electrical discharge pumping causes ionization of the gas, particularly along the axis of the cavity where electron density is highest. The resulting electrons become hot due to the presence of the electric field. These electrons excite the molecules in the gas to create the inversion necessary for lasering. The inversion of the vibrational energy levels occurs in the $CO_2$ molecules, the helium and the nitrogen being additives for effecting power output efficiency. Since the electron discharge occurs mainly down the center of the cavity, dissociation occurs mainly in this same central area since the electrons cause the $CO_2$ to dissociate into $CO+O$. For efficient lasering action, it has been found desirable to provide a uniform electrochemistry of the gas mixture throughout the whole cavity, and to additionally provide uniform temperature of the gas mixture throughout the cavity, such temperature in conventional devices being lower toward the outer walls of the enclosing envelope or tube. This will be apparent when it is understood that passage of electrons through the central portion of the cavity and gas creates heat in this area.

In gas lasers of known and conventional constructions employing molecular gases, the gas is introduced into one end of the cavity under relatively low pressures and passes through the cavity in a substantially laminar fashion. Thus, since the electron discharge passes through the device lengthwise thereof and substantially down the center of the cavity, the undesired dissociation of the gas or at least one of the gas components occurs in all of such structures, as well as the undesired temperature distribution.

SUMMARY OF THE INVENTION

In accordance with the present invention, means is provided to create turbulence in the gas as it passes through the length of the cavity. Such turbulence produces a uniform distribution or electrochemistry of the gases in the mixture throughout the cavity and, consequently, also provides a uniform temperature throughout the volume of the gas within the cavity. This is caused by the fact that there is thus provided a mixing action which tries to override the dissociation produced by the electrons so that there results a uniform mixture of the gases throughout the whole cavity, even when the gas is in its excited state. Such turbulence may be created by utilizing at the inlet port of the device a gas nozzle or injector which is inclined or angled with respect to the longitudinal axis of the tube. Thus, the gas is introduced into the cavity under pressure and at an angle which causes it to bounce, eddy or otherwise be urged in a nonlinear fashion through the cavity. Another means for creating turbulence in the gas in accordance with this invention is to inject it into one end of the cavity at a velocity which is substantially above the critical Reynolds number, thus creating turbulence and producing eddys in the gas as it passes through the cavity. An additional means for creating turbulence is the provision of relatively small baffles at intervals through the length of the cavity, which baffles may be used as supplements to the angled nozzle or the high-velocity flow mentioned above.

BRIEF DESCRIPTION OF THE DRAWING

Other objectives and advantages of the invention will become apparent from the following description taken in connection with the accompanying drawings wherein.

DESCRIPTION OF THE PREFERRED EMBODIMENTS

Figure 1:
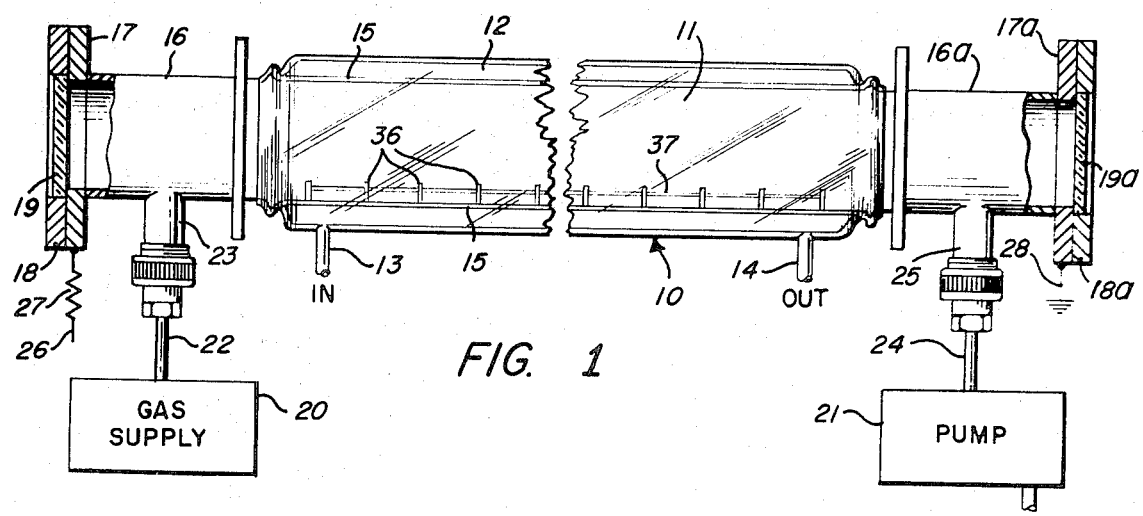
FIG. 1 is an elevational view, partly in section, of a gas laser of a type embodying the invention.

Referring more particularly to the drawings wherein like characters of reference designate like parts throughout the several views, there is shown in FIG. 1 one type of gaseous laser which embodies an elongated glass envelope 10 comprising a longitudinally extending inner chamber 11, and an outer chamber 12 which encircles the inner chamber throughout substantially the entire length thereof. Adjacent respective opposite ends of the structure are located an inlet port 13 and an outlet port 14 which communicate only with the outer chamber 12 for the circulation of a liquid coolant through the outer chamber, the coolant being provided for the purpose of cooling the walls 15 of the inner chamber 11 and, thus, also cooling gas within the chamber. The means for pumping the coolant and causing it to continuously flow through chamber 12 does not constitute in itself a part of this invention and, therefore, will not be described in detail herein.

The ends of the envelope 10 are each sealed by suitable glass-to-metal sealing methods to adjacent ends of respective hollow metal cylinders 16 and 16a, with the interior chamber 11 of the tube 10 communicating with the interiors of both cylinders 16 and 16a. At the outer ends of each cylinder 16 and 16a, which cylinders are preferably formed of metal, there are provided flanges 17 and 17a, respectively, to which are suitably sealed annular bezels 18 and 18a. Within each of the bezels is located a mirror 19 and 19a, which mirrors form reflecting elements similar to a Fabry-Perot interferometer, thus forming an optical cavity embodying the tube 10 and cylinders 16-16a. One of the mirrors is wholly reflective and the other mirror is partially reflective so that light generated within the device, in the normal operation of such laser devices, will oscillate between the mirrors axially of the device and will eventually escape through the partially reflective mirror.

In conventional gas lasers of the type described, a selected molecular gas or mixture of gases is introduced into one end of the bulb or envelope 10 through one of the cylinders 16 from a suitable gas supply 20. Connected to the other cylinder 16a is a fore pump 21 which is provided for the purpose of causing the gas to flow from supply 20 through the cavity and out of the device. In FIG. 1, the gas supply is indicated by box 20. However, in lasers employing a gaseous medium which comprises a mixture of gas components, such a gas supply 20 will normally constitute a separate tank for each gas component, the individual tanks being connected so as to simultaneously pass gas therefrom into a common conduit 22 from which it passes as a mixture through an inlet tube 23 into cylinder 16. In such a device, the gas components are usually thoroughly mixed before they pass into conduit 22 so that thorough mixing of the gas components occurs before the gas medium enters the effective lasing cavity which comprises the bulb 10 and cylinders 16-16a. The pump 21 may be suitably connected as by a conduit 24 and outlet tube 25 to the other cylinder 16a.

In the operation of a gas laser, when the gaseous medium is being drawn longitudinally through the device by the pump 21, it is subjected to an electrical discharge which causes ionization of the gas within the cavity. Such ionization creates ions and electrons which become hot due to the presence of an electric field. In the presently described device, the flanges 17-17a of cylinders 16 and 16a, respectively, are utilized as electrodes and are suitably connected into electrical circuitry (not shown) for the purpose of applying a suitable potential for creating the electrical discharge as is well known in the art. For present purposes, a lead 26 including resistance 27 is shown attached to the electrode or flange 17, and flange or electrode 17a is shown as being grounded as indicated at 28. Additional details of the pumping circuit are conventional, as mentioned above, and may be found in any descriptive material relating to electrical discharge pumping of gas lasers.

When the gaseous medium within the device is pumped, as described above, the molecules in the gas are excited and population inversion of the energy levels thereof occurs as is well known. One particularly suitable gaseous medium is comprised of the combination of amounts of nitrogen, carbon dioxide and helium. In such a gas, inversion of the vibrational energy levels occurs in the carbon dioxide molecules since the helium and nitrogen components are provided only as additives for effecting power output efficiency. Other suitable molecular gaseous compositions are nitrogen dioxide, carbonyl sulphide, carbon monoxide, hydrogen fluoride and hydrogen bromide, for example.

I have discovered that, although the gases are thoroughly mixed prior to their injection into the cavity, the electrical discharge pumping causes dissociation of the molecules of the particular molecular gas component of the mixture. For example, the carbon dioxide molecules in the nitrogen-carbon dioxide-helium mixture will dissociate in the area where the electron discharge occurs. In a device of the character described, such electron discharge is known to occur along the central portion of the device and along the longitudinal axis thereof. Thus, dissociation does not occur throughout the whole cross section of the tube. Such dissociation is referred to herein as a change in electrochemistry of the gaseous medium. This reduces the efficiency, that is, the gain and power, of a gas laser.

It is also known that the gaseous medium should be efficiently cooled in order to provide high-gain and high-power output from a laser of this type. When electrical discharge pumping occurs, the electrons along the central portion of the cavity create heat which thus destroys the thermal equilibrium throughout the cross section of the device, heat thus being generated along the axis thereof while the portions of the gas mixture adjacent the cooled walls 15 remain at a lower temperature. This heat disadvantageously affects the laser output by thermally populating the lower energy level.

In accordance with the present invention, there is provided means for creating turbulence in the flow of the gaseous medium throughout the cavity. This is done so that a supply of nondissociated gas is constantly supplied to the longitudinally extending central portion of the cavity and so that a more uniform temperature is established throughout the cross section of the flowing gaseous medium. Proper turbulence of the gas causes a mixing action which tries to override the dissociation of the molecular gas component so that there is achieved a more uniform mixture of the gases throughout the whole cavity, even in the excited state of the gaseous medium. This has been found to produce a much higher gain and higher power output in the electromagnetic radiation produced by the laser.

In order to produce the desired turbulence, there is provided an injector 29 (FIG. 2) which is mounted within the gas supply inlet 23. The injector 29 has a nozzle 30 at one end which protrudes through an opening 31 in the cylinder 16, and has its opposite end fixed to a threaded sleeve 32 carried by a tubular member 33 which is suitably attached by a threaded nut 34 to the outer end of inlet 23. The nozzle 30 preferably has a constricted exit opening 35 and is directed so as to inject the mixed gaseous medium into the interior of the cylinder 16 and envelope 10 at an angle to the longitudinal axis thereof. By this provision, a gaseous medium which is supplied to the injector 29 through conduit 22 will be caused to pass through nozzle 30 into the interior of the device and, in doing so, will constantly be caused to bounce or eddy as it flows through the device, thus providing the desired electrochemistry of the gas within the tube and also providing increased heat transfer to the wall 15.

Figure 3:
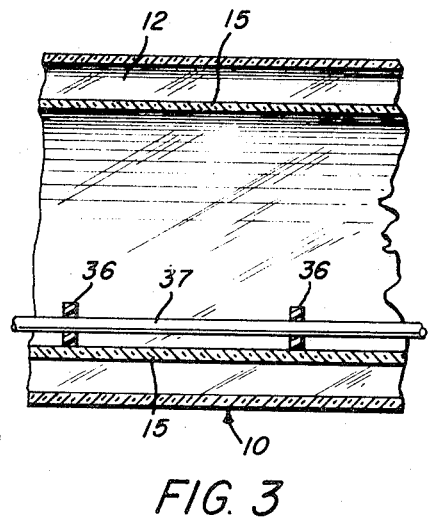
FIG. 3 is an enlarged axial sectional view through a portion of the laser cavity illustrating baffles therein.
Figure 4:
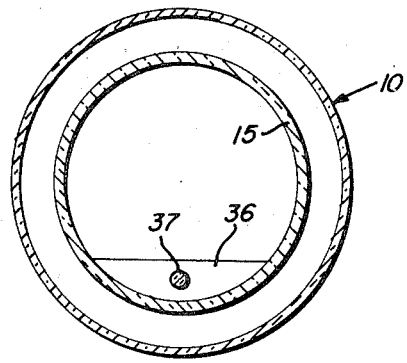
FIG. 4 is a cross-sectional view of the structure shown in FIG. 3.

In order to create additional turbulence of the gas as it passes through the envelope 10, a number of relatively small baffles 36 are located at spaced intervals longitudinally of the envelope, as shown in FIGS. 1, 3 and 4. The baffles may be formed of any convenient material, either dielectric or metal, may be affixed to the inside walls 15 of the cavity by any convenient technique, or may be supported in position upon a longitudinally extending glass or other dielectric rod 37 as shown. Such a baffle structure interrupts and causes turbulence in the gas flow, as opposed to annular baffles, for instance, which merely reshape the linear flow path of the gas.

Figure 5:
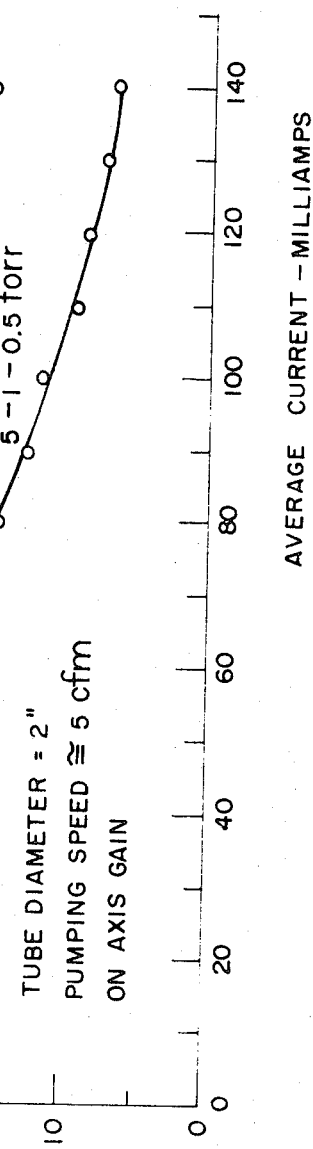
FIG. 5 is a diagrammatic illustration of a gas laser embodying the modification of the invention wherein gas is pumped at a high velocity to create turbulence.

Another method of providing turbulence in accordance with this invention is by introducing the gas into the cavity at a velocity which is greater than the critical Reynolds number associated with the particular gas geometry, viscosity and cavity length involved. Such a device is illustrated in FIG. 5 and comprises a laser envelope 38 which receives gas in one end thereof from a supply 39 via a conduit 40. At the other end of the envelope gas is withdrawn through conduit 41 by a pump 42. A recirculation pump or blower 43 is connected to the respective conduits 40-41 and provides means whereby the gas is forced through the envelope 38 at a high velocity. As pointed out above, when the velocity exceeds the critical Reynolds number, turbulence is automatically created. For example, the critical Reynolds number for a laser of the type described can be arrived at by the formula:

$$R = (vr/\gamma)$$

where $v$ = the flow velocity, $r$ = the radius, and $\gamma$ = the kinematic viscosity of the gaseous medium. When the critical Reynolds number equals 1,000-10,000, typically 2,000, the flow becomes turbulent. Such means for creating turbulence may be used either with or without baffles.

Figure 2:
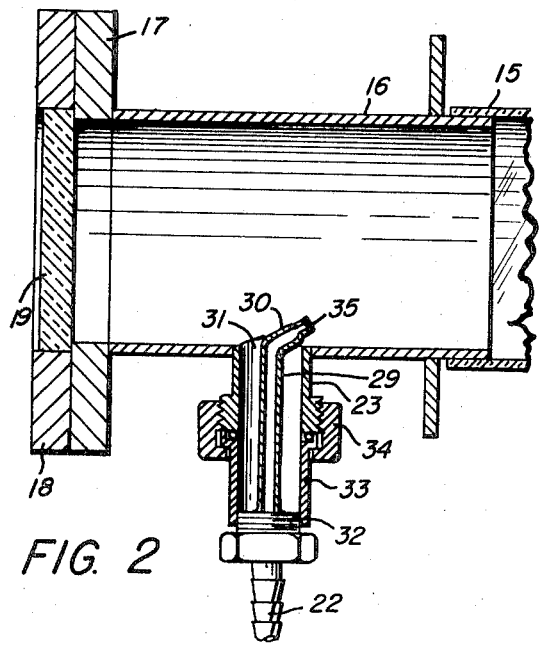
FIG. 2 is an enlarged axial sectional view of the end portion of the device into which the gas is introduced and illustrating an angled injector nozzle in accordance with one modification of the invention.
Figure 6:
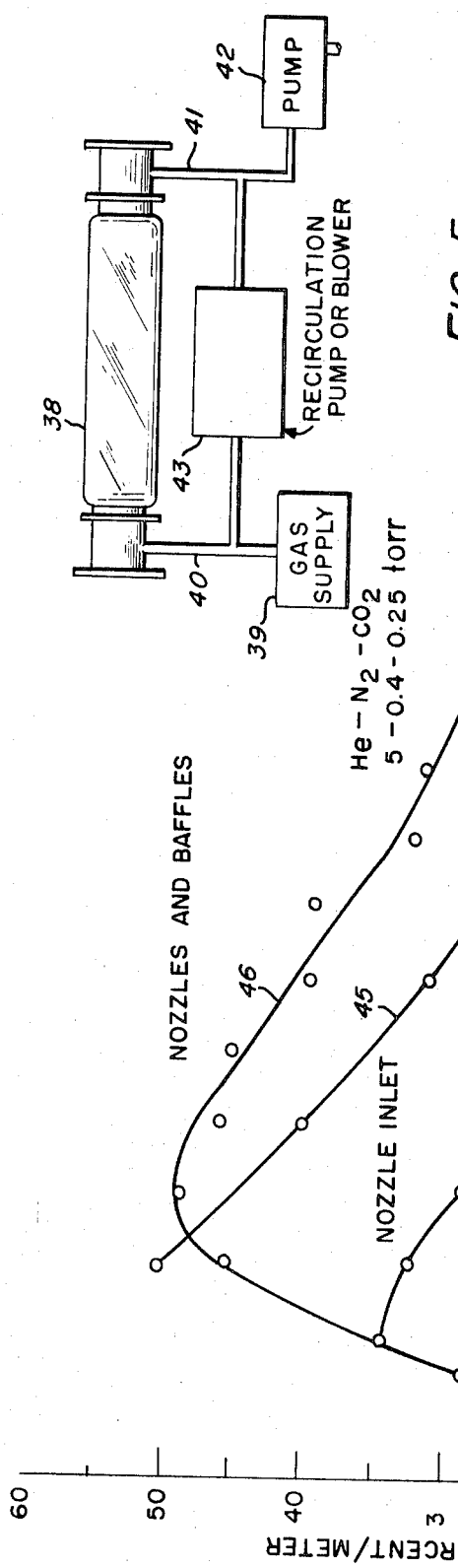
FIG. 6 is a graph showing increased gain provided by turbulence in a gas laser.

In FIG. 6 there is shown a chart which vividly depicts a measurement of the increase in optical gain along the axis of the tube as a result of turbulence. For example, curve 44 illustrates the gain of a helium-nitrogen-carbon dioxide gas laser with a 2-inch diameter cavity and pumping speed of about 5 c.f.m., and utilizes a standard inlet wherein the gaseous medium flows at a relatively low velocity and in a laminar fashion through the cavity. Curve 45 illustrates such a laser when an angled nozzle is provided as illustrated in FIG. 2. Curve 46 illustrates the same type of gas laser wherein the inclined nozzle and baffles are both employed in accordance with this invention.

It has been found that the "on axis" gain increases at least 50 percent with baffles only, at least 100 percent with the angled injector nozzle only, and at least 200 percent with both the angled nozzle and the baffles. Off axis gain increase is only slightly less. This device, therefore, may be used as an optical amplifier with increased gain. A substantial increase in laser power has also been achieved when the device is operated as an oscillator.

From the foregoing, it will be apparent that a novel gas laser structure has been provided which produces more efficient control of the gaseous medium as it passes through the device and which, as a result, achieves a more desirable beam of output radiation.

I claim:

1. In combination:
   a gaseous active laser medium for amplification of electromagnetic wave energy by stimulated emission of radiation of at least a portion of said medium;
   envelope means for containing said gaseous active laser medium coupled to said envelope means for producing inversion of energy levels in said medium for the generation of said radiation;
   optical means for directing said radiation through said medium along at least one predetermined path;
   means coupled to said envelope means to extract heat from said gaseous medium via said envelope means; and
   means for moving at least portions of said gaseous medium with respect to said cooling means along at least portions of said path at rates sufficient to create turbulence in said gaseous medium to increase thermal uniformity and substantially reduce dissociation of said gas thereby increasing said radiation.

2. A combination in accordance with claim 1, further comprising an optical resonant cavity placed about the envelope means to resonate and enhance the coupling of stimulated emission of radiation from the laser medium.

3. A combination in accordance with claim 2, in which said turbulence creating means provides a supply of nondissociated gas to the central portion of said gaseous medium.

4. A combination in accordance with claim 3, wherein said gaseous medium comprises at least one molecular gas component.

5. A combination in accordance with claim 3, wherein the turbulence in the gaseous medium is produced by an injector nozzle through which the medium passes, and
   an optical envelope means being an axis into which said medium enters from said nozzle, the nozzle being angled with respect to said axis of the envelope means.

6. A combination in accordance with claim 3, wherein said gaseous medium is confined within an envelope means having an entrance opening and said means for creating turbulence in the gaseous medium comprises an injector nozzle located at said entrance opening and through which the medium passes as it enters the envelope means, the nozzle being angled with respect to the axis of said envelope means for initially directing said medium into the envelope means at an angle to said axis.

7. A combination in accordance with claim 6, wherein said means for creating turbulence additionally comprises a plurality of baffles positioned within and spaced apart longitudinally of the envelope means adjacent the circumference thereof.

8. A combination in accordance with claim 5, wherein said means for creating turbulence in the gaseous medium comprises means for forcing said medium to pass through the envelope means at a rate which is above the critical velocity range as established by the formula $vr/\gamma$, where $v$ = flow velocity, $r$ = radius, and $\gamma$ = the kinematic viscosity of the medium.

9. A gas laser comprising:
   envelope means for containing a gaseous active laser medium and for coupling optical radiation from said medium;
   means for creating a flow of said gaseous active laser medium through the said envelope means;
   means for subjecting the medium in the envelope means to electrical discharge pumping thereof with consequent inversion of energy levels and production of electromagnetic output radiation;
   means for creating turbulence in the gaseous medium sufficient to form a substantial thermal contact between the medium and at least a portion of the walls defining the envelope means as it passes through the envelope means, and for reducing the dissociation of said gaseous medium by establishing increased thermal uniformity throughout the cross section of said flowing gaseous medium.

10. A gas laser in accordance with claim 9, wherein said gaseous medium comprises at least one molecular gas component.

11. A gas laser in accordance with claim 9, wherein the means for creating turbulence in the gaseous medium comprises:
   an injector nozzle through which the medium passes as it enters the envelope means, the nozzle being angled with respect to the axis of the envelope means, the angle being in the range between 0°< angle <90°.

12. A gas laser in accordance with claim 9, wherein the envelope means has an entrance opening and the means for creating turbulence in the gaseous medium comprises an injector nozzle located at the entrance opening and through which the medium passes as it enters the envelope means, the nozzle being angled with respect to the axis of the envelope means for initially directing the medium into the envelope means at an angle to the axis, the angle being in the range 0°< angle <90°.

13. A gas laser in accordance with claim 12, wherein said means for creating turbulence additionally comprises a plurality of baffles positioned within and spaced apart longitudinally of the envelope means adjacent the circumference thereof.

14. A gas laser in accordance with claim 9, wherein said means for creating turbulence in the gaseous medium comprises means for forcing said medium to pass through the envelope means at a rate which is above the critical velocity range as established by the formula $vr/\gamma$, where $v$ = flow velocity, $r$ = radius, and $\gamma$ = the kinematic viscosity of the medium.

15. A gas laser in accordance with claim 9, wherein said gaseous active laser medium comprises a mixture of carbon dioxide, helium, and nitrogen.

16. A gas laser comprising:
   envelope means for containing an active gaseous laser medium and for coupling radiation from said active laser medium;
   means for creating a flow of said gaseous active laser medium through said envelope means;
   means for subjecting the medium in the envelope means to electrical discharge pumping thereof with consequent inversion of energy levels and production of electromagnetic output radiation; and
   means for creating turbulence in the gaseous medium sufficient to form a substantial thermal contact between the medium and at least a portion of the walls defining the envelope means as it passes through the envelope means such that a supply of nondissociated gas is supplied to the central portion of the envelope means for establishing substantially increased thermal uniformity throughout the cross section of the flowing gaseous medium.

17. A gas laser in accordance with claim 16, wherein said gaseous active laser medium comprises a mixture of carbon dioxide, helium, and nitrogen.

18. A gas laser comprising:

an optical resonant cavity having an axis;

means for creating a flow of gaseous active laser medium through the cavity along the axis;

means for subjecting the cavity to electrical discharge pumping with consequent inversion of energy levels and production of electromagnetic output radiation;

means for creating turbulence in the gaseous medium sufficient to form a substantial thermal contact between the medium and at least a portion of the walls defining the cavity as it passes therethrough, said turbulence creating means including:

an injector nozzle through which the medium passes as it enters the cavity; and a plurality of baffles positioned within and spaced apart longitudinally of the cavity adjacent the circumference thereof; and means for reducing the dissociation of the gas supplied to the central portion of the cavity for establishing substantially increased thermal uniformity throughout the cross section of the flowing gaseous medium.

19. A gas laser in accordance with claim 18, wherein said gaseous medium includes carbon dioxide.

20. A gas laser comprising:

an optical resonant cavity having an axis;

means for creating a flow of a gaseous active laser medium through the cavity along the axis;

means for subjecting the medium in the cavity to electrical discharge pumping with consequent inversion of energy levels and production of electromagnetic output radiation; and means for creating turbulence in the gaseous medium sufficient to form a substantial thermal contact between the medium and at least a portion of the walls defining the cavity as it passes therethrough, whereby a supply of nondissociated gas is supplied to the central portion of the cavity for establishing increased thermal uniformity throughout the cross section of the glowing gaseous medium, said turbulence creating means including:

an injector nozzle through which the medium passes as it enters the cavity; and a plurality of baffles positioned within and spaced apart longitudinally of the cavity adjacent the circumference thereof.

21. A gas laser as in claim 9, further including an optical resonant cavity placed about the envelope means to resonate and enhance coupling of the stimulated emission of radiation from the laser medium.

22. A gas laser as in claim 16, further including an optical resonant cavity placed about the envelope means to resonate and enhance coupling of the stimulated emission of radiation from the laser medium.

23. A gas laser comprising:

envelope means for containing an active gaseous laser medium and for coupling radiation from said medium;

means for creating a flow of a gaseous active laser medium through said envelope;

means for subjecting the medium in the envelope means to pumping thereof with consequent inversion of energy levels and production of optical output radiation;

means for creating and maintaining turbulence in the flow of said medium to increase the output power of said output radiation.

24. In a method for increasing the output power of a gas laser employing a flowing gaseous active laser medium the steps of:

creating turbulence in said flowing medium; and maintaining turbulence in the flow of said gaseous active laser medium while the gas is being pumped to produce stimulated emission of coherent optical radiation from said gas.

* * * * *

UNITED STATES PATENT OFFICE
CERTIFICATE OF CORRECTION

Patent No. 3,633,125          Dated January 4, 1972

Inventor(s) David R. Whitehouse

It is certified that error appears in the above-identified patent and that said Letters Patent are hereby corrected as shown below:

On the Title Page after "Lexington, Mass." delete -- Continuation-in-part of application Ser. No. 625,732, Mar. 24, 1967, now abandoned. This application June 22, 1970, Ser. No. 48,494 -- .

Column 1, line 4, after "continuation" delete -- in-part -- .

Column 5, line 27, after "medium" insert -- ; -- then make a new paragraph and before "coupled" insert -- means -- .

Signed and sealed this 1st day of October 1974.

(SEAL)
Attest:

McCOY M. GIBSON JR.            C. MARSHALL DANN
Attesting Officer              Commissioner of Patents